United States Patent [19]

Burgener et al.

[11] 4,272,707
[45] Jun. 9, 1981

[54] MOTOR CONTROL TECHNIQUES

[75] Inventors: Robert C. Burgener; Philip T. Martin, both of Columbus, Ohio

[73] Assignee: Interlake, Inc., Oak Brook, Ill.

[21] Appl. No.: 968,557

[22] Filed: Dec. 11, 1978

[51] Int. Cl.³ .............................................. H02P 1/04
[52] U.S. Cl. .................................. 318/139; 318/258; 318/302; 318/434
[58] Field of Search ............... 318/139, 258, 259, 262, 318/269, 270, 280, 274, 302, 305, 312, 371, 373, 374, 398, 430, 464, 465, 273, 434; 180/65 C, 65 R; 290/8, 9, 45, 50

[56] References Cited

U.S. PATENT DOCUMENTS

| 3,943,420 | 3/1976 | Hind .................................. 318/139 |
| 3,952,236 | 4/1976 | Hoover .............................. 318/139 |
| 4,052,647 | 10/1977 | Thompson ........................ 381/139 |
| 4,090,114 | 5/1978 | Thompson ........................ 318/139 |
| 4,096,418 | 6/1978 | Marumoto et al. ................ 318/139 |

Primary Examiner—Gene Z. Rubinson
Assistant Examiner—John W. Redman
Attorney, Agent, or Firm—Allegretti, Newitt, Witcoff & McAndrews

[57] ABSTRACT

Improved logic circuitry combined with an efficient and economical motor controller which enables a DC motor to reverse the direction of a vehicle and to maintain the speed of the vehicle within narrow speed boundaries during acceleration, deceleration and constant speed conditions.

7 Claims, 13 Drawing Figures

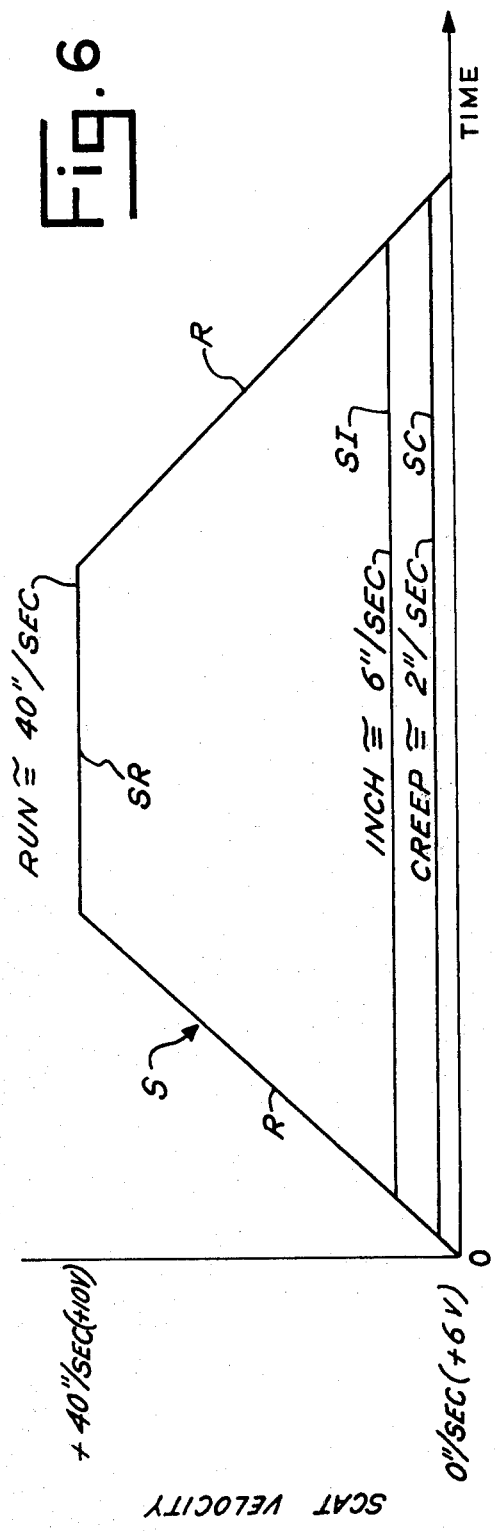
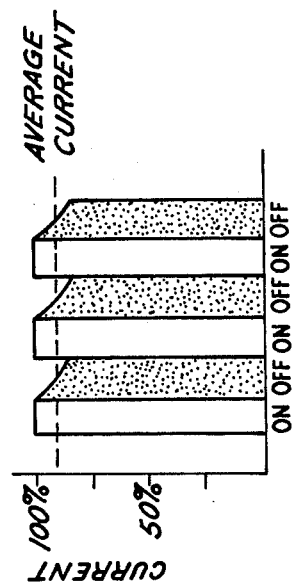
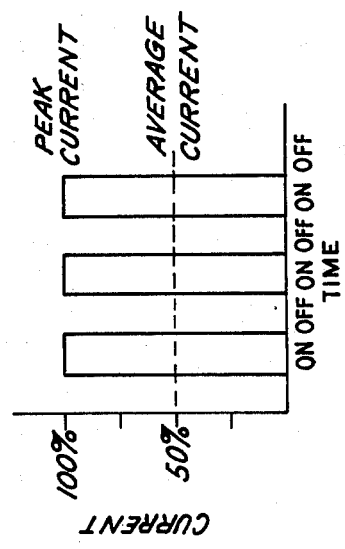

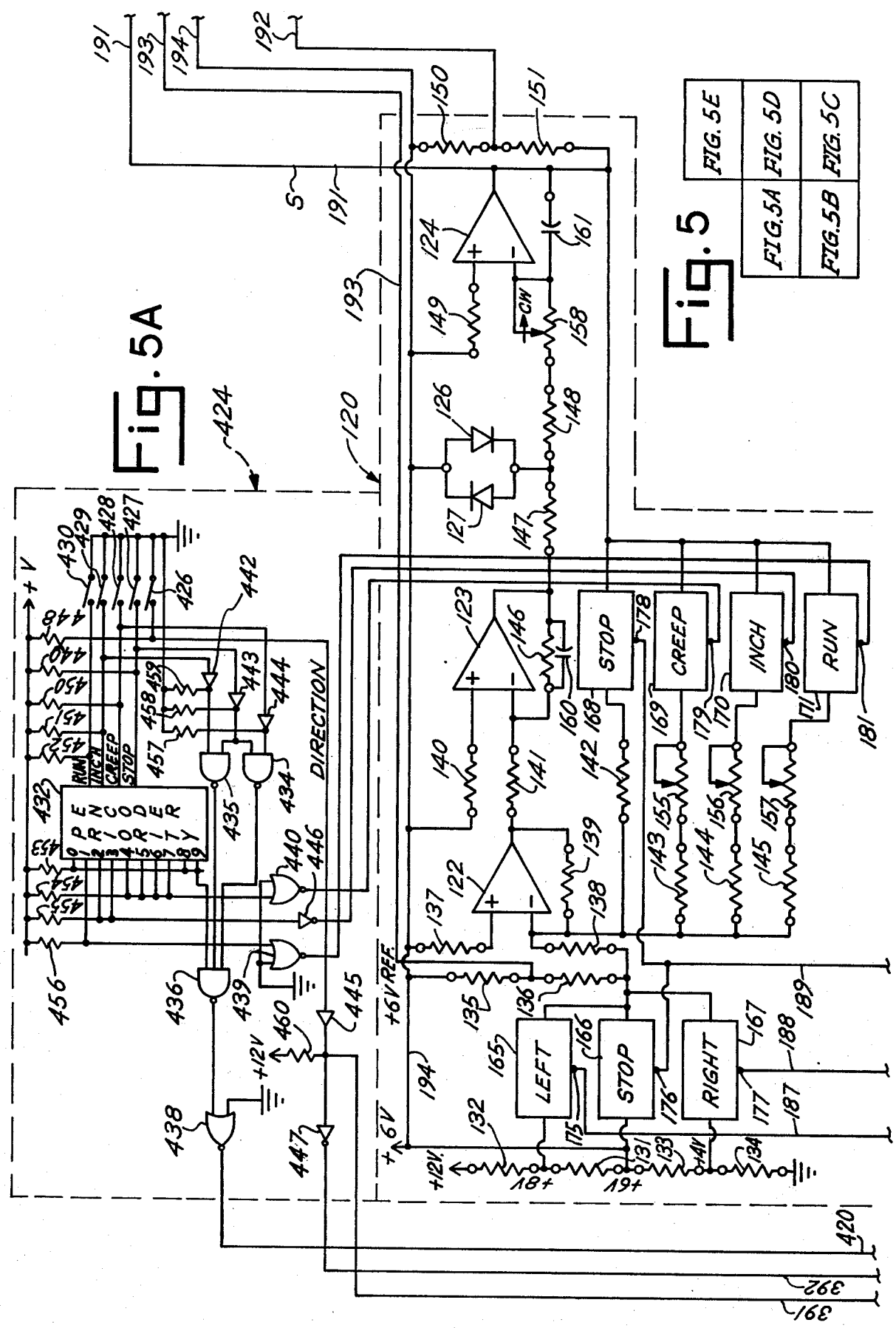

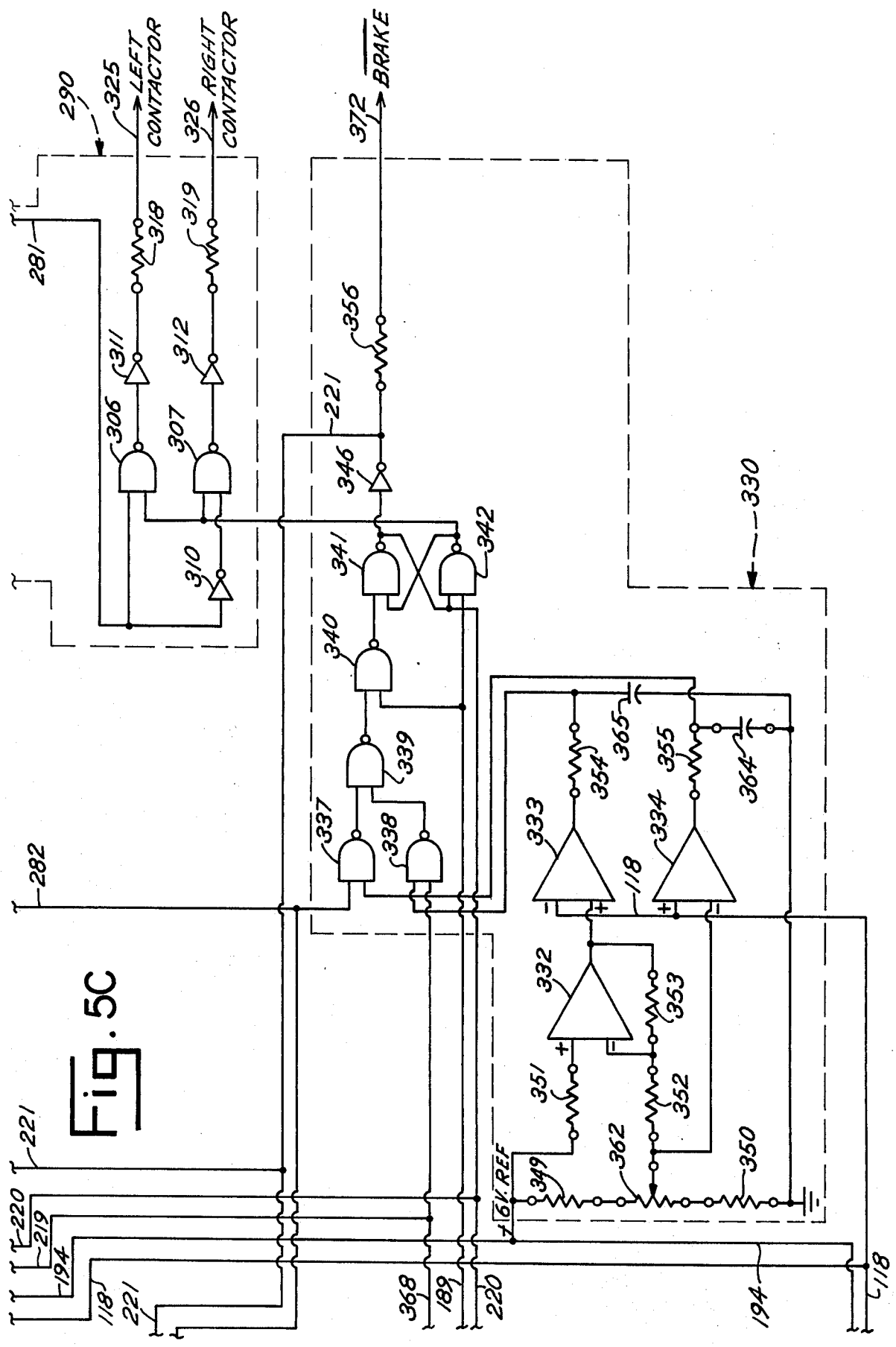

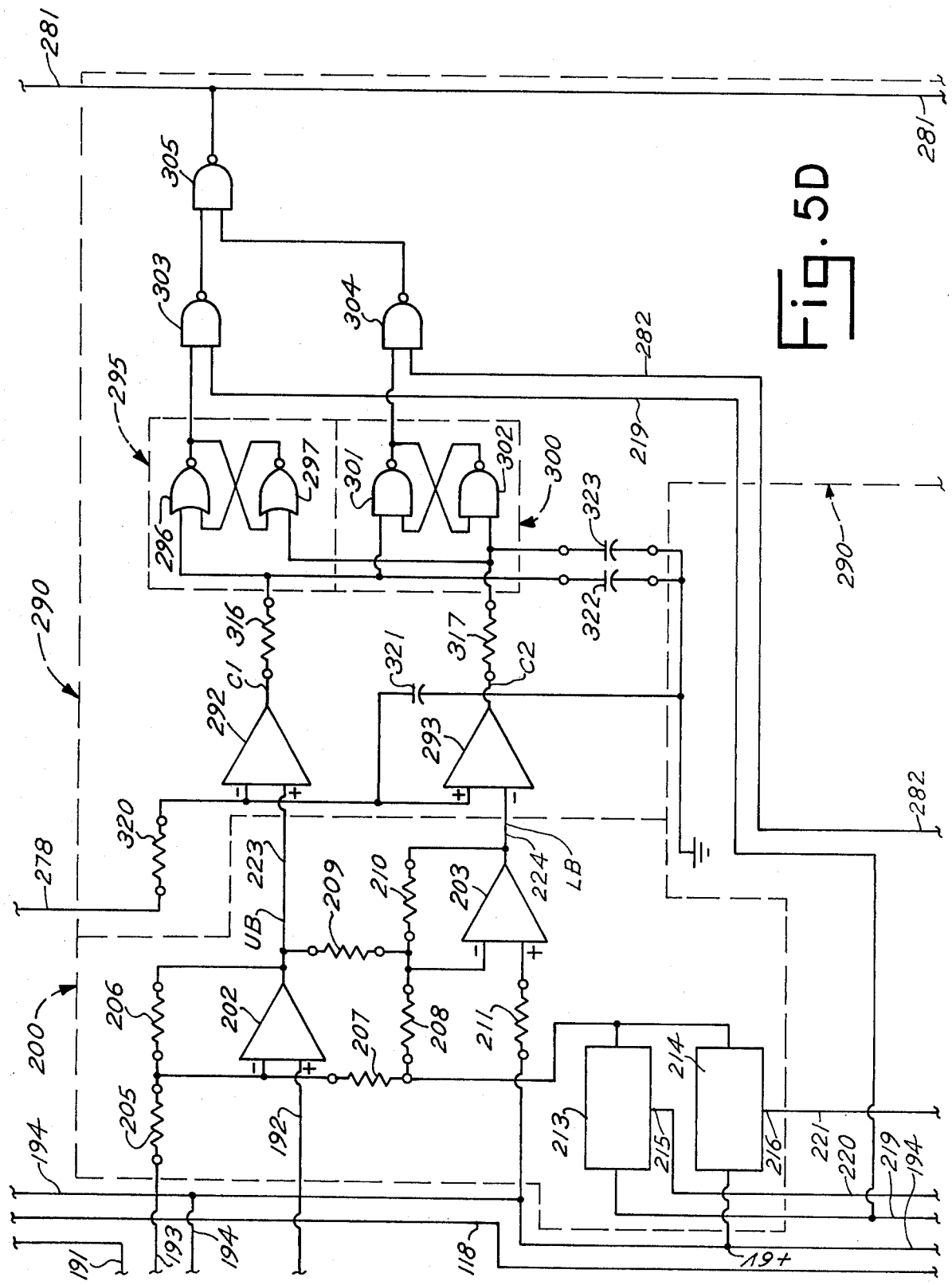

MOTOR CONTROL TECHNIQUES

BACKGROUND AND SUMMARY OF THE INVENTION

An inexpensive and accurate way of controlling the movement of a motor-driven vehicle, such as a battery-powered fork lift truck or a remote-controlled carrier, has long been sought. In the interest of efficiency and economy, some such prior vehicles have employed DC motors which are controlled by a single quadrant, open-loop, chopper-type controller. Although such controllers are efficient, they lack the capability of decelerating the vehicle in a regulated manner by the application of reverse motor torque which opposes the motor or by braking. This defect limits their usefulness, since the rate of deceleration is not constant for all loads on the vehicle but varies with the weight of the load and slope on which the vehicle is operating.

Four quadrant controllers have been used to overcome the foregoing defects. However, such controllers are prohibitively expensive for many applications.

Accordingly it is a prime object of the present invention to provide a vehicle propelled by a DC motor operated from a modified single-quadrant, open-loop, chopper-type controller in combination with apparatus for enabling the vehicle to move in either first or second opposite directions within preselected speed boundaries.

Yet another object is to provide a vehicle of the foregoing type in which the vehicle is maintained within the speed boundaries by providing improved apparatus which controls the direction in which motor-generated torque is applied.

Still another object of the present invention is to provide a vehicle of the foregoing type in which the actual speed of the vehicle is compared to a desired speed both during acceleration and deceleration. The speed comparison is employed to maintain the actual speed of the vehicle between upper and lower limits.

Yet another object is to provide a vehicle of the foregoing type in which the DC motor is powered by a battery.

DESCRIPTION OF THE DRAWINGS

These and other objects, advantages and features of the present invention will hereafter appear for purposes of illustration, but not of limitation, in connection with the accompanying drawings, wherein like numbers refer to like parts throughout and wherein:

FIG. 3 illustrates exemplary battery current pulses which are generated by the battery shown in FIG. 2;

FIG. 4 illustrates exemplary motor current pulses resulting from the battery current pulses shown in FIG. 3;

FIG. 5 illustrates the manner in which FIGS. 5A-5E should be arranged;

FIGS. 5A, 5B, 5C, 5D and 5E are electrical schematic diagrams illustrating a preferred form of logic circuitry used in connection with the controller shown in FIG. 2; and FIGS. 6-8 are waveforms of voltages produced at the correspondingly-lettered points of the logic circuitry shown in FIGS. 5A-5E.

DESCRIPTION OF THE PREFERRED EMBODIMENT

Figure 1:
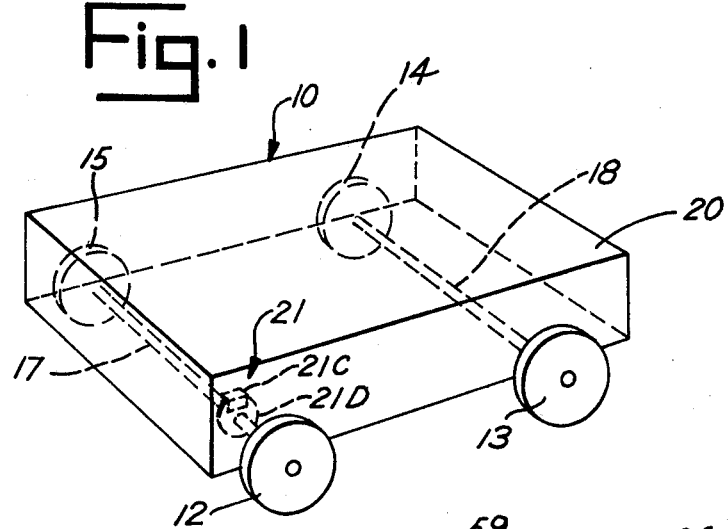
FIG. 1 is a perspective view of a preferred embodiment of a simplified form of vehicle made in accordance with the present invention.

Referring to FIG. 1, the preferred embodiment of the invention is used to power a vehicle 10 having wheels 12-15 rotatably supported on axles 17 and 18 that are mounted on a vehicle body 20. The vehicle can be held in place on a slope not to exceed 4 percent by means of a solenoid-activated, spring-operated brake 21 connected adjacent to one of the wheels. The brake includes a disc 21D mounted to rotate with axle 17 and a caliper 21C which normally is spring-biased into contact with disc 21D. It is a feature of the control that negative torque is applied to reduce the vehicle speed at a controlled deceleration until the vehicle is slowed to approximately 0.5 inches per second. At this point the brakes are released to stop the vehicle. Brake release at speeds greater than 0.5 inches per second would quickly wear away the lining of the brakes.

Figure 2:
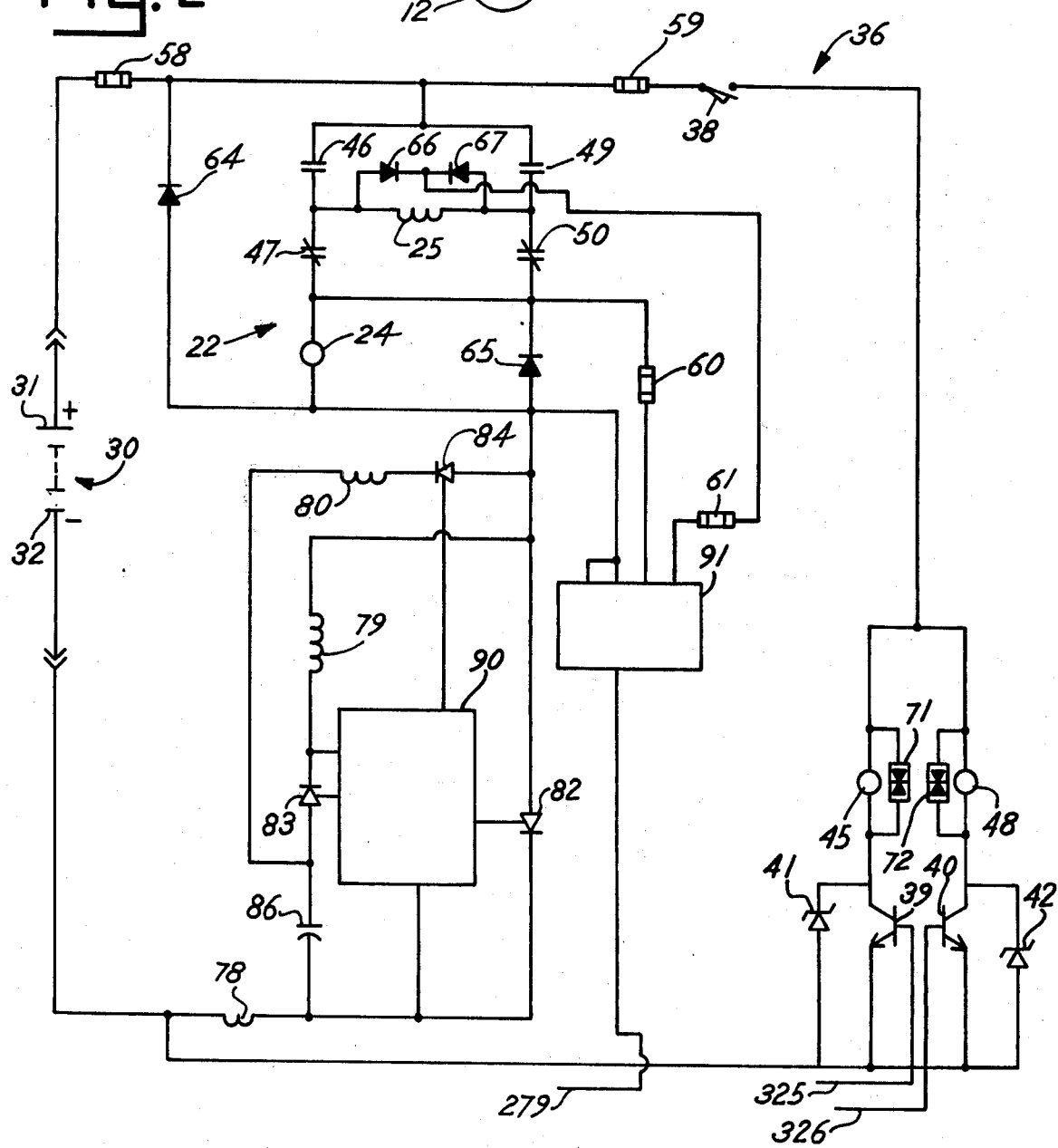
FIG. 2 is an electrical schematic diagram of an exemplary motor control circuit for use in connection with the present invention.

Referring to FIG. 2, a conventional DC drive motor 22 is connected to each of the wheels through a drive mechanism (not shown). The motor comprises an armature winding 24 which generates the torque produced by the motor. The direction of motor rotation is dependent on the direction of current flow through a field winding 25. Power is supplied to the motor from a conventional DC battery 30 having a positive terminal 31 and a negative terminal 32.

The transfer of power from battery 30 to motor 22 is controlled by a motor controller 36, such as a modified form of Model 50 manufactured by General Electric Company, which operates through a key switch 38.

The propulsion of the vehicle in the left direction is controlled by a left relay coil 45 which operates a normally-open contact 46 and a normally-closed contact 47. The propulsion of the vehicle in the right direction is controlled by a right relay coil 48 which operates a normally-open contact 49 and a normally-closed contact 50. The vehicle is accelerated by controlling the amount of current in a conductor 279. The controller also comprises transistors 39 and 40, zener diodes 41 and 42, fuses 58-61, switching diodes 64-67, coil protectors 71 and 72, transformer coils 78 and 79, wound on a common core, an inductor 80, SCR'S 82-84, a capacitor 86 and oscillator circuits 90, 91, all connected as shown.

Contactors 45 and 48 are connected to one side of the battery when power switch 38 is closed. These contactors are connected to the negative side of the battery through transistors 39 and 40. When line 325 is driven high by logic circuits which are explained later, transistor 39 conducts. Contact 46 then closes and contact 47 opens, thereby connecting the motor to the battery and enabling the vehicle to move left. At the same time, diode 66 applies battery power to circuits 90 and 91. When line 326 is driven high, transistor 40 conducts. Contact 49 then closes and contact 50 opens, thereby connecting the motor to the battery and enabling the vehicle to move right. At the same time, diode 67 applies battery power to circuits 90 and 91. The logic circuit, to be described later, controls the current through line 279, thereby controlling the speed of the motor.

The oscillator circuit 90 is capable of switching SCR 82 into conduction. When SCR 82 is conducting, current flow is from battery terminal 31 through fuse 58, one of normally-opened contacts 46 or 49, field coil 25, one of normally-closed contacts 47 or 50, armature winding 24, SCR 82, and transformer coil 78, to the negative terminal 32 of the battery. The initial rising DC current through coil 78 induces a voltage across transformer coil 79, driving the cathode of SCR 83 below battery negative and causing current to flow through the gate circuit of SCR 83, thereby turning it on. A current then flows from coil 79 through SCR 82, capacitor 86 and SCR 83 back to coil 79, charging capacitor 86 negative until the transformer saturates, reducing the current flow to zero and turning off SCR 83. The voltage across coil 79 then swings from negative to positive causing current to flow in the gate circuit of SCR 84, thereby turning it on. As SCR 84 conducts, capacitor 86 discharges around the circuit composed of capacitor 86, SCR's 82 and 84 and inductor 80. This discharge current opposes the battery current through SCR 82 so that the resulting current is zero. SCR 82 then is turned off. The foregoing mode of operation results in current pulses through the battery of the type shown in FIG. 3.

While SCR 82 is turned off, the energy stored in the motor, by virtue of its inductance, causes current to circulate through the motor around the loop formed by diode 64, thus providing "flyback current". FIG. 4 shows the nature of the motor current which is composed of both battery current and the inductive flyback current. The average motor current is greater than the average battery current. The SCR's in this circuit convert the battery current at low battery voltage into a higher motor current at a lower motor voltage. This transformation is almost lossless because SCR 82 is completely conducting or non-conducting at all times except for a few microseconds transition between these states.

The time for the start of the next cycle of operation is determined by the time that the oscillator circuit takes to oscillate. This frequency of oscillation is controlled by regulating the amount of current flowing through conductor 279 (FIG. 2). Slow speed is attained by having minimum current flow in conductor 279. As the amount of current increases, the speed of the motor increases.

Use of a motor control circuit of the type shown in FIG. 2 is an important feature which enables the vehicle to be regulated in an efficient and economical manner.

Referring to FIGS. 5A-5E, an improved form of logic circuitry for cooperating with motor controller 36 in order to accurately control vehicle 10 basically comprises a tachometer circuit 100, a speed generator circuit 120, a boundary generator circuit 200, a drive circuit 230, a direction circuit 290, a brake generator circuit 330, a direction store circuit 380, a stop signal processor circuit 400, a direction-speed command circuit 424 and a reference generator 464.

Tachometer circuit 100 (FIG. 5B) includes a tachometer generator 102 which is driven by the wheels and axle of vehicle 10 and which generates a voltage directly proportional to the speed of the wheels. A positive voltage is generated when the wheels move the vehicle to the left, and a negative voltage is generated when the wheels move the vehicle to the right. Circuit 100 also includes an operational amplifier (opamp) 104, diodes 106, 107, resistors 109-113, a potentiometer 114, and capacitors 115, 116, all connected as shown. The resulting tachometer voltage (T), which is proportional to the speed of the wheels of vehicle 10, is transmitted to the other portions of the circuitry over a conductor 118.

Resistor 110 and capacitor 116 form a feedback network which raises the gain of opamp 104 at high frequencies, thereby increasing the response speed of the overall system. By using this feedback network, the system has a response time period on the order of the duration of a single motor control pulse (of the type shown in FIG. 3), or less. Without such a high speed of response, power might be applied to the wheels of the vehicle in an oscillatory manner that could result in undesired sharp fluctuations (jerks) in vehicle speed. Such fluctuations would be more likely under conditions of light load, low speed, or both. Resistors 110 and capacitor 116 prevent such fluctuations and provide smoother control over a greater range of speeds that would be otherwise possible.

Speed generator circuit 120 (FIG. 5A) is used to produce a voltage S on lead 191 which represents the desired speed and direction of vehicle 10 (when compared with the output of reference generator 464). Basically, the circuit generates a voltage S (FIG. 6) proportional to the desired speed. Voltage S is held constant to indicate a desired speed which is to be sustained by the vehicle, and the voltage is changed linearly with time to form a ramp or acceleration signal in order to indicate a rate of speed change (i.e., acceleration or deceleration) which is desired. The circuit includes opamps 122-124, diodes 126, 127, resistors 131-151, potentiometers 155-158, and capacitors 160 and 161, all connected as shown. The circuitry, as illustrated, is capable of driving the vehicle at inch, creep, and run rates of speed. These speeds are controlled by resistor networks 143 and 155, 144 and 156, 145 and 157 which are selected by analog gates 165-171 having gate terminals 175-181, respectively. The speed generator circuit operates from a single voltage supply, and the circuit outputs include a speed signal on line 191 where signals greater than 6 volts command a speed to the right and signals less than 6 volts d-c command a speed to the left. Line 193 is a plus 6 volt reference signal input to the speed control; line 194 is the power supply plus 12 volt d-c level input to the circuit; and line 192 is the voltage of line 141 as modified by resistive voltage divider consisting of resistors 150 and 151.

FIG. 6 illustrates an exemplary set of speed signals generated when the vehicle moves to the right, accelerates from a standing start to a run speed, inch speed or creep speed (illustrated by curves SR, SI and SC, respectively), and then decelerates to a stopped position.

Figure 7:
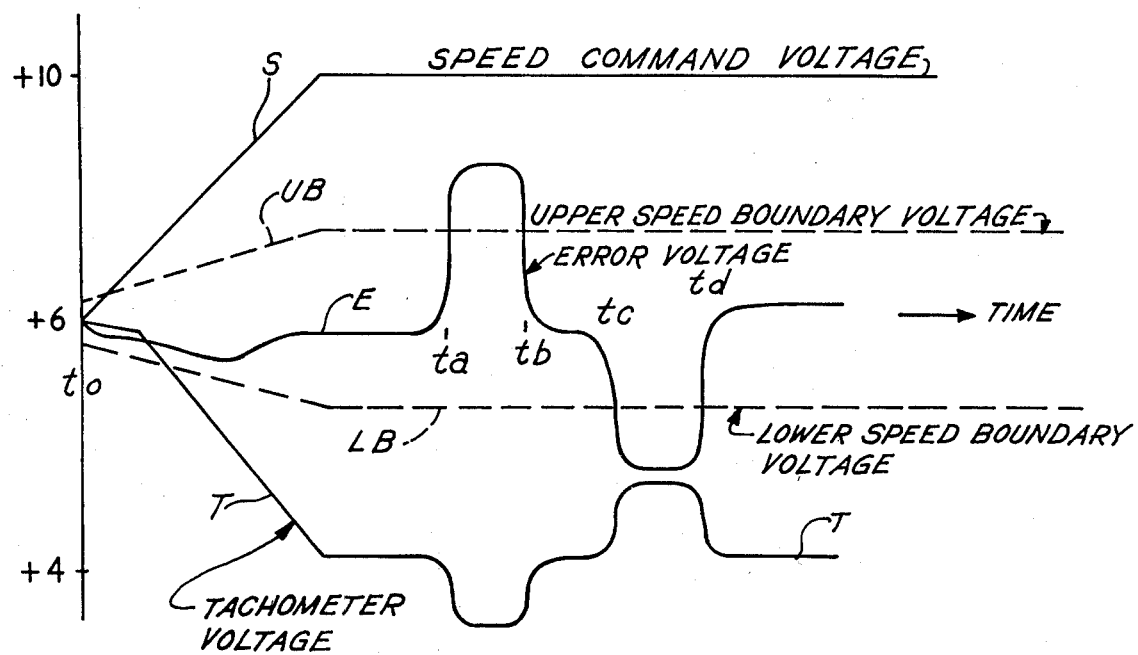

Boundary generator circuit 200 (FIG. 5D) generates a signal representation of the desired speed boundaries for the vehicle. In the circuitry as shown, an upper boundary signal and a lower boundary signal are generated for each different speed signal generated by circuit 120. Boundary generator circuit 200 comprises opamps 202, 203, resistors 205-211, and analog gates 213-214 which are operated through gating terminals 215-216, respectively, all connected as shown. Circuit 200 receives inputs over conductors 219-221, and generates its output signals on conductors 223, 224. FIG. 7 shows a typical upper boundary signal UB generated on conductor 223 and a simultaneous typical lower boundary signal LB generated on conductor 224. By generating upper and lower boundary signals, circuit 200 enables the vehicle to be maintained within narrow limits of the desired speed during acceleration, deceleration and sustained speed conditions.

Drive circuit 230 (FIG. 5E) compares tachometer signal T with speed signal S to obtain a resulting error voltage E. Voltage E regulates the amount of torque generated by the motor in order to accelerate or decelerate the vehicle in a controlled manner. Circuit 230 comprises opamps 232-235, an inverter 237, diodes 239-241, a transistor 243, and resistors 245-266. Analog gates 270 and 272 are switched through gate terminals 272, 273, respectively. Gates 270 and 271 control the polarity of the signal transmitted from the output of opamp 236 to the inverting input of opamp 234. If the logic signal transmitted to terminal 277 is high, the signal at pins 2 and 3 of gates 270 and 271 has the same polarity as the output of opamp 236; if the logic signal transmitted to terminal 272 is low, the signal at pins 2 and 3 of gates 270 and 271 has the reverse polarity of the output of opamp 236. The circuit also includes capacitors 275, 276, output conductors 278, 279 and an input conductor 281

Drive circuit 230 determines the difference between the actual vehicle speed (tachometer signal T) and the desired vehicle speed (signal S) in order to produce an error signal E of the type shown in FIG. 7. The error signal is used to determine the amount of torque produced by motor 22 so that the speed of the vehicle is maintained within the upper and lower speed boundaries defined by signals UB and LB (generated by circuit 200). If the speed of the vehicle goes outside these boundaries, such as at time ta (FIG. 7), the torque of motor 22 is reversed in a manner described latter, so that the vehicle tends to remain within the desired speed boundaries.

The direction of torque application by motor 22 is determined by direction circuit 290 (FIGS. 5C and 5D). The circuit includes an input conductor 282, opamps 292, 293, a flipflop 295 comprising NOR gates 296, 297, another flipflop 300 comprising NAND gates 301, 302, additional NAND gates 303-307, inverters 310-312, resistors 316-320 and capacitors 321-323, all connected as shown. A positive signal on output conductor 325 causes left control transistor 39 to conduct (FIG. 2) and a positive signal on output conductor 326 causes right control transistor 40 to conduct (FIG. 2).

Reverse motor torque under the control of circuit 290 is the basic means used to decelerate vehicle 10. However, when the vehicle is slowed to a speed somewhat less than one inch per second, brakes 21 are applied by a brake generator 330.

Generator 330 (FIG. 5C) comprises opamps 332-334, NAND gates 337-342, an inverter 346, resistors 349-356, a potentiometer 362 and capacitors 364, 365, all connected as shown. In order to activate the brakes, inverter 346 generates a negative signal on output conductor 372 which deenergizes a brake solenoid (not shown), thereby closing brakes 21 against the wheels of the vehicle.

Figure 5B:
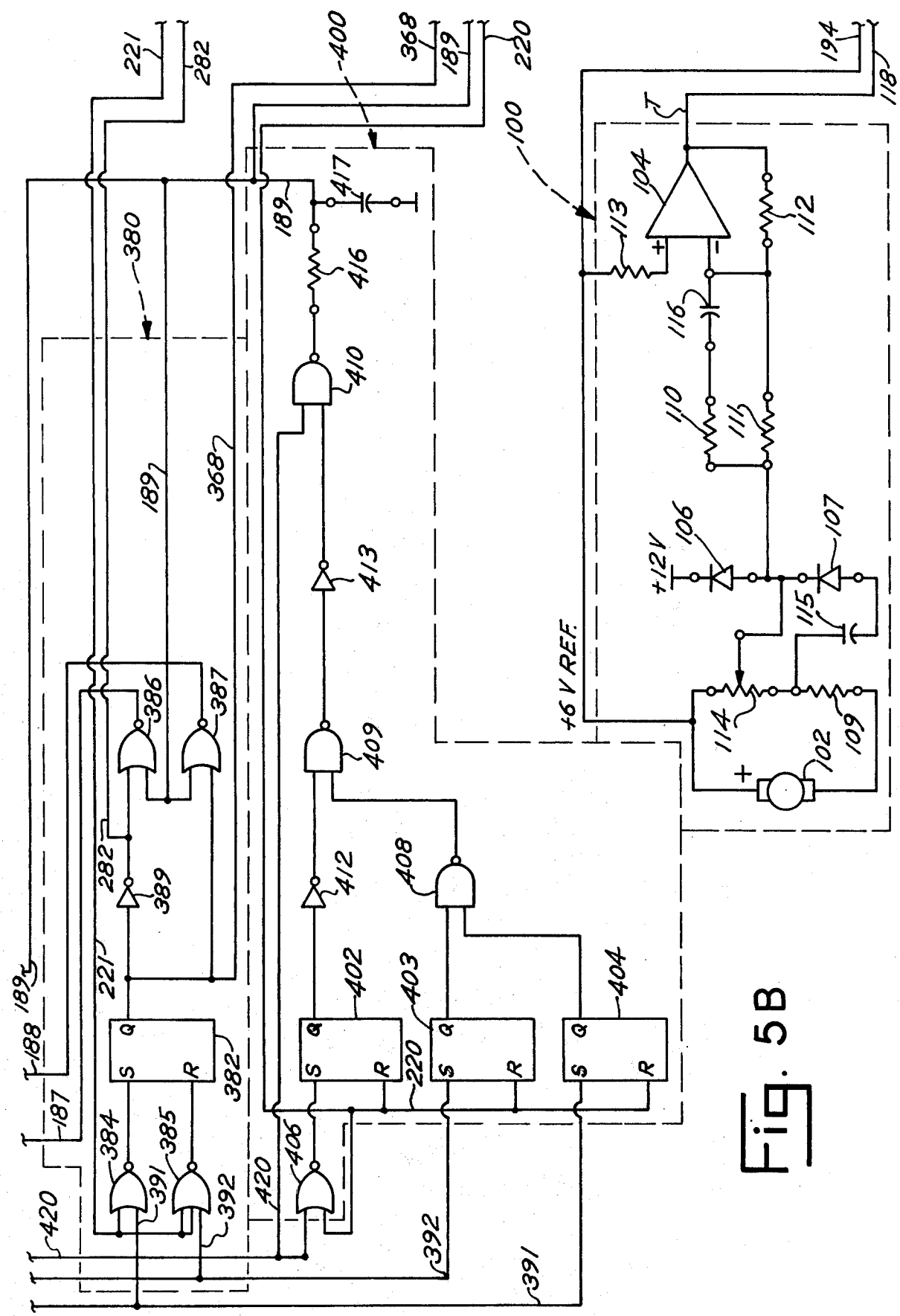

In order to provide proper initial conditions for the remaining circuits, a desired direction of vehicle movement is stored in a direction store circuit 380 (FIG. 5B). Circuit 380 includes a flip-flop 382, NOR gates 384-387, an inverter 389, a left input conductor 391 and a right input conductor 392.

Whenever the desired direction of the vehicle is changed, the vehicle comes to a complete stop before proceeding in an opposite direction. The stop between change of directions is supervised by a stop signal processor circuit 400 (FIG. 5B). The circuit includes flip-flops 402-404, a NOR gate 406, NAND gates 408-410, inverters 412, 413, a resistor 416 and a timing capacitor 417. The logic state of an input conductor 420 determines the existence of a stop command by an operator of the vehicle.

Direction and speed commands from an operator of the vehicle are processed by direction speed command circuit 424 (FIG. 5A). The circuit includes a right-left direction switch 426, a stop switch 427, a creep switch 428, an inch switch 429, and a run switch 430. Switches 427-430 are connected to a BCD/Decimal Decoder Driver (such as part number 74LS145 manufactured by Texas Instruments) connected as a priority encoder 432. In response to the simultaneous closure of one or more of switches 427-430, encoder 432 enables the following functions to receive priority from highest to lowest: stop, creep, inch, run. Circuit 424 also includes NAND gates 434-436, NOR gates 438-440, buffers 442-445, inverters 446, 447 and resistors 448-460, all connected as shown.

A reference generator 464 (FIG. 5E) provides a plus 6 volt reference voltage to various operational amplifiers in the circuitry. Generator 464 operates from a conventional 12 volt supply through an operational amplifier 466 and a resistor 468.

DESCRIPTION OF OPERATION

In order to accelerate or decelerate the vehicle to a desired sustained speed, speed signal generator 120 generates a voltage ramp S (FIG. 6) which terminates in a sustained voltage level SR. The sustained voltage level corresponds to the commanded speed so that its value changes for a creep, run or inch command. The ramp rate at which the voltage S approaches its command or sustained level controls the acceleration of the vehicle. Since a single power supply is used, a run right command generates a positive ramp which starts at 6 volts and goes to 10 volts (see FIG. 6). For a run left command, the ramp starts at plus 6 volts and goes to plus 2 volts. The speed coefficient is 40 inches per second for 4 volts. Analog gates 165-167 of speed single generator 120 (FIG. 5A) determine the direction of the ramp voltages and analog gates 169-171 determine the sustained voltage at which the ramps stabilize. By switching one or more of the analog gates into the circuit, the speed signal S generated on conductor 191 achieves the ramp direction and sustained voltage level which correspond to the desired direction and speed for the vehicle. When a stop is commanded, speed voltage S always ramps toward plus 6 volts, the voltage corresponding to a zero velocity.

Circuit 200 (FIG. 5D) generates the upper and lower boundary speed voltages UB and LB by means of fixed and variable reference voltages. The fixed voltage is derived through 193 from the connection between resistors 135 and 136 (FIG. 5A). The variable reference voltage is derived from speed signal S through conductor 192 by means of resistors 150, 151. Referring to FIG. 7, if circuit 120 produces speed signal S, circuit 200 produces upper and lower signals UB and LB, respectively. The fixed and variable voltages are summed by opamp 202 (FIG. 5D) using plus 6 volts as a reference. For example, if a right direction command is given, the voltage on conducter 193 is fixed at approximately 5.68 volts. Since this is less than plus 6 volts, it is considered a negative voltage by opamp 202. The variable voltage is positive (See FIG. 6) for a right direction command. As a result, the difference between the 5.68 volts and 6 volts is added to the positive ramp speed signal S by opamp 202 in order to generate signal UB. Under normal conditions, analog gate 214 is closed so that plus 6 volts is applied to both opamps 202 and 203. Under these conditions, opamp 203 inverts the output of opamp 202 (using plus 6 volts as a reference) to form voltage LB (FIG. 7). Thus, voltage LB is the inverse of voltage UB with reference to plus 6 volts. This is an important feature of the invention which enables the speed of the vehicle to be controlled within narrow speed boundaries during acceleration, deceleration, and sustained speed conditions.

Figure 5E:
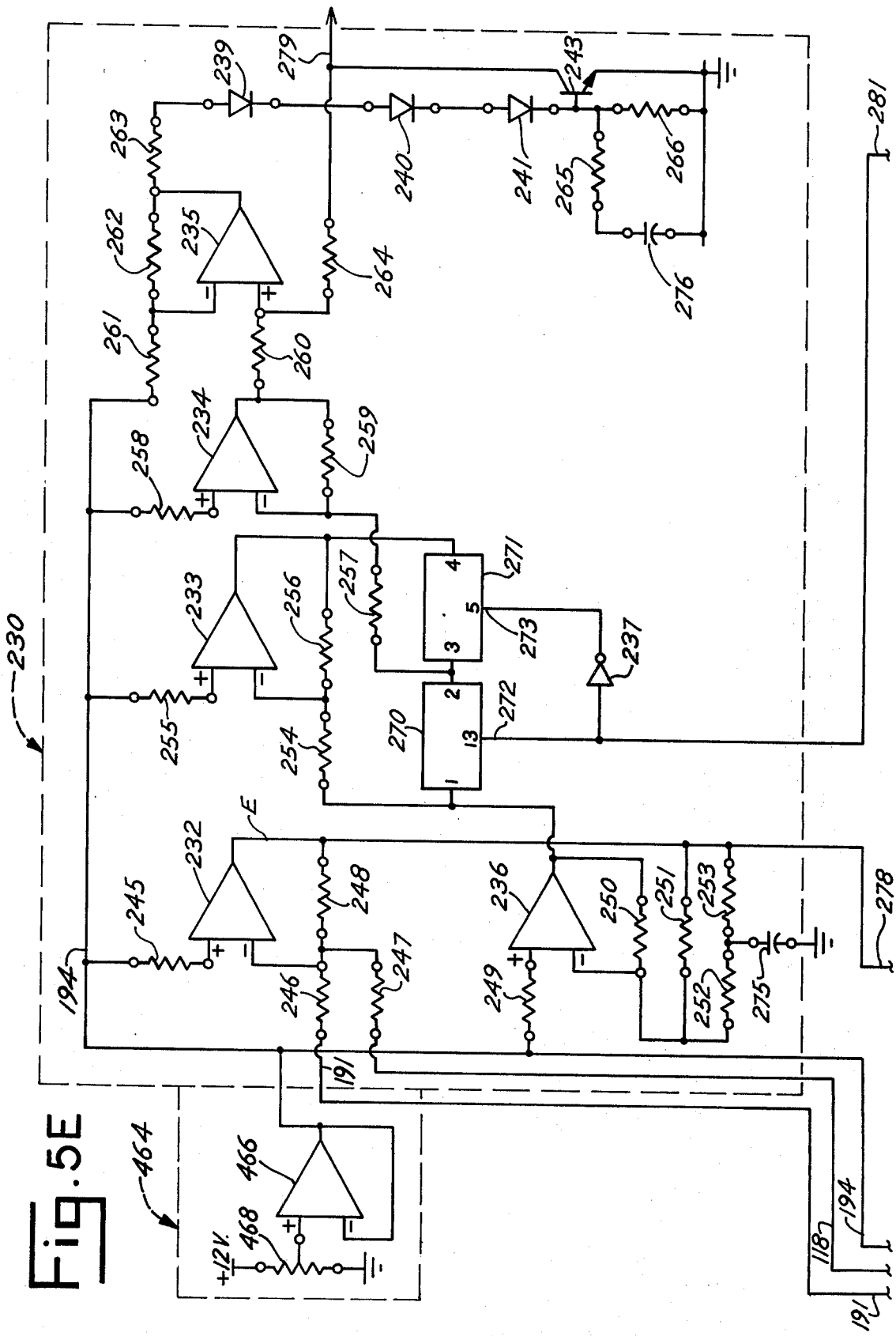

Once the speed and boundary signals begin to be generated, the vehicle begins to move in the proper direction so that the tachometer voltage T increases. The tachometer voltage is summed with the speed voltage (using 6 volts as a reference) in opamp 232 (FIG. 5E). This operation results in an error voltage E of the type shown in FIG. 7. As long as the error voltage stays within the voltage boundaries defined by signals UB and LB, the vehicle is within its proper speed boundaries, and no change of the direction of torque applied by the motor is required.

In order to generate the above-described tachometer, speed, boundary and error voltages, it is important for the circuitry to establish the proper initial conditions. If the proper conditions are not established, the voltages may begin to generate in the wrong direction or toward the wrong sustained voltage level. The manner in which the initial conditions are established can be best understood by means of the following example.

Assume that the vehicle is stopped (i.e., stop switch 427, FIG. 5A, is closed) and is ready for a right direction command. Just before the right command is given, the output of NAND gate 410 (FIG. 5B) is high, because stop conductor 420 is low. Due to the time constant created by resistor 416 and capacitor 417, conductor 189 is not immediately driven low when the output of NAND gate 410 is driven low due to the opening of stop switch 427. As a result, the outputs of NOR gates 386 and 387 cannot immediately close analog gate 167 (FIG. 5A), and signal generator 120 momentarily will be prevented from generating a right command speed signal. In addition, the brake signal on conductor 220 and the $\overline{\text{brake}}$ signal on conductor 221 are delayed (FIGS. 5B, 5C).

Figure 8:
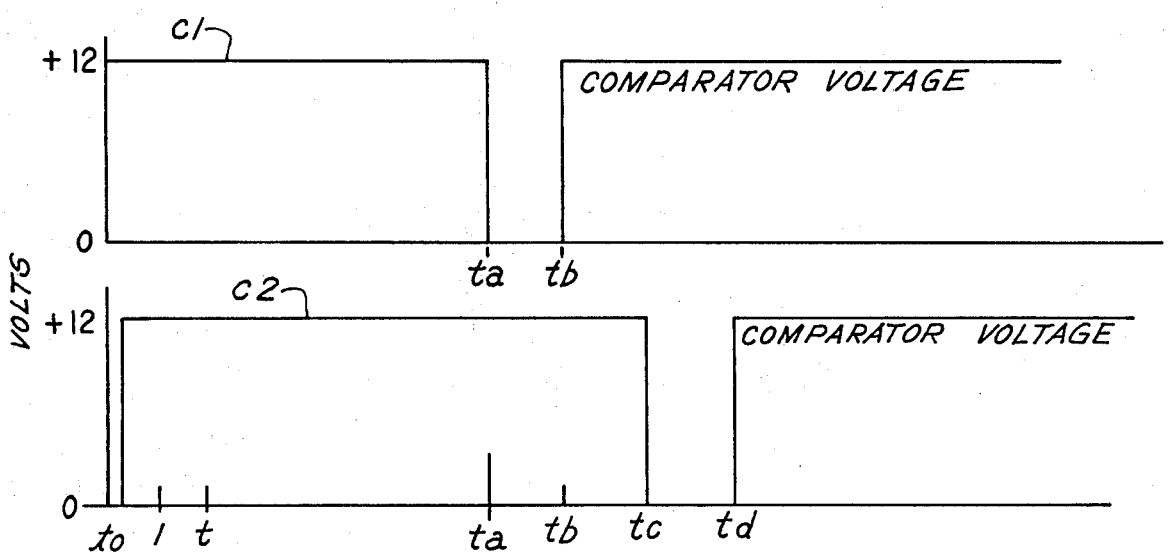

When the right command is given, by operating switch 426 (FIG. 5A) at time to, the Q output of latch 382 (FIG. 5B) is driven low, and the low voltage is applied to resistors 207 and 208 through analog gate 213 (FIG. 5D). As a result, the outputs of opamps 202 and 203 are both forced to about +7.5 volts. Since the inputs of comparators 292 and 293 connected to resistor 320 are at about +6 volts, the output of comparator 292 is switched to about +12 volts and the output of comparator 293 is switched to about 0 volts (FIG. 8). The 0 volt output of comparator 293 sets the output of NAND gate 301 low which, in turn, forces the output of NAND gate 304 high. The +12 volt output of comparator 292 forces the output of NOR gate 296 low and NAND gate 303 high which, combined with the high output of NAND gate 304, forces the output of NAND gate 305 (conductor 281) low. When conductor 281 is switched low, output conductor 326 (FIG. 5C) is switched high through inverter 310, NAND gate 307 and inverter 312. This causes transistor 40 to conduct (FIG. 2). At the same time, analog gate 271 (FIG. 5E) is closed so that the error signal from the output of opamp 232 drives the oscillator in motor controller 36 (FIG. 2) via inverting opamp 233.

At this point in time, the proper direction and the proper polarity for the speed signal both have been selected, and the circuitry is prepared to generate a speed signal and a boundary representation which will result in vehicle movement to the right. This is an important feature which enables the proper circuit conditions to be established before the speed and boundary signals are generated.

A few milliseconds after the right direction command to given, the output on the conductor 189 goes low (FIG. 5B), thereby closing analog switch 167 (FIG. 5A) and enabling speed signal generator 120 to produce a ramp up signal S which results in vehicle movement to the right. As previously explained, boundary signals UB and LB (FIG. 7) also are generated while the speed signal is being produced.

The operation for left travel of the vehicle from a stop condition is similar to the operation for right travel, except that flip-flop 295 (FIG. 5D) is set by the output of comparator 292 so that conductor 281 is switched to a high state, thereby enabling the left direction transistor 39 in controller 36 to conduct (FIG. 2).

Referring to FIG. 7, once a speed signal S is generated and the vehicle begins to move to the right, tachometer signal T and speed signal S are summed in opamp 232 (FIG. 5E), thereby generating error voltage E. As long as the vehicle speed stays within the boundaries defined by signals UB and LB, the right direction transistor 40 in controller 36 remains conductive. However, if the vehicle exceeds upper boundary speed UB, the conductive states of transistors 39 and 40 are reversed in the following manner.

Referring to FIG. 7, assume error voltage E exceeds upper boundary signal UB at time ta. As shown in FIG. 8, this condition forces the output of opamp 292 (FIG. 5D) low, so that the output of NAND gate 301 is switched high, thereby switching conductor 281 high. When conductor 281 goes high, it switches off transistor 40 through inverter 310, NAND gate 307 and inverter 312 (FIG. 5C). At the same time, the high state of conductor 281 switches transistor 39 on through NAND gate 306 and inverter 311. The high state of conductor 281 also opens analog gate 271 (FIG. 5E) and closes analog gate 270, whereby the polarity of drive circuit 230 is reversed since opamp 233 is bypassed by gate 270 and resistor 257. As a result of this operation, motor direction transistors 39 and 40 in controller 36 are reversed so that reverse torque (i.e., torque urging the vehicle to the left) is applied to the vehicle through motor 22. This is an important feature which enables the vehicle to be maintained within narrow speed boundaries and to be decelerated by use of reverse motor torque.

Due to the reverse torque, the vehicle decelerates within the required speed boundaries at time tb. At this time, the output of comparator opamp 292 goes high (FIG. 8), but the output state of NAND gate 301 is not changed, since it is part of a latch.

Assuming the vehicle decelerates below lower speed boundary LB at time tc, the output of comparator opamp 293 is switched low (FIG. 8) so that the output of NAND gate 301 again is switched low, thereby restoring the original right direction command conditions. The vehicle then will accelerate again to the right and again will be within speed boundaries UB, LB by time td. At that time, the output of comparator 293 is switched high (FIG. 8). The operation going left is nearly identical, except that NOR gates 296 and 297 control direction and NAND gate 304 is forced high by a state of conductor 282.

The operation of brake generator 330 (FIG. 5C) will be described assuming that the vehicle is traveling left. If a stop command is given while the vehicle is traveling left, speed signal S will ramp up to 6 volts, and the vehicle will decelerate accordingly. Under these conditions, conductor 189 is in a high state, and the output of NAND gate 341 is low as long as the outut of NAND gate 339 is low. The output of NAND gate 339 can be driven high by either NAND gate 337 or NAND gate 338 going low. Since conductor 368 is high when the vehicle is moving left, the output of NAND gate 338 is determined by the signal from opamp 333 which changes state from low to high when the vehicle speed is somewhat less than one inch per second when going left.

As the output of opamp 333 changes from low to high, the output of NAND gate 338 switches from high to low. This change propagates through NAND gates 339 and 340 and resets the latch consisting of NAND gates 341 and 342 so that the output of NAND gate 341 is switched from low to high and the output of inverter 346 is switched from high to low, thereby deenergizing the brake solenoid and applying the brakes. In addition the brake signals are inverted by NAND gate 342 which goes from high to low. This low at the inputs to NAND gates 306 and 307 forces the outputs of these gates high. These highs pass through inverters 311 and 312 forcing lines 325 and 326 low. The lows de-energize the left contactor 45 and right contactor 48, thereby removing power from motor 22 (FIG. 2).

Braking is accomplished in a similar manner if the vehicle is moving to the right, except that the output of NAND gate 338 is forced high, and the output of comparator opamp 334 is used to apply the brakes.

The operation of the circuitry when a direction command is reversed will be illustrated by assuming that the vehicle is initially stopped. Under this condition, the Q output of flip-flop 403 or 404 will be low (FIG. 5B) forcing the output of NAND gate 408 high, thereby driving the output of NAND gate 409 low. Since conductor 420 is low from a stop signal, the output of NAND gate 410 is also high, thereby resulting in a stop condition.

Now assume that a left direction command is given by closing switch 426 and opening switch 427 (FIG. 5A). Since the brake signal on conductor 220 is still high, the output of flip-flop 404 (FIG. 5B) remains low, so that the output of NAND gate 408 remains high. At this time, the Q output of a flip-flop 402 also remains low. At the time the left direction command is given, the stop signal on conductor 420 goes from low to high, thereby causing conductor 189 to switch low after a time delay controlled by the time constant of resistor 416 and capacitor 417. After the time delay, the brake signal on conductor 220 goes low, but none of flip-flops 382, 402, 403 or 404 changes state. That is, the Q output of flip-flop 402 is low, the Q output of flip-flop 403 is high and the Q output of flip-flop 404 is low.

Assuming the direction command is changed from left to right, the Q output of flip-flop 404 will change from low to high. This change propagates through NAND gate 408 to generate a high condition on the output of NAND gate 409.

The high at the output of NAND gate 409 also propagates through inverter 413 and NAND gate 410 to force a time-delayed high on conductor 189. After this brief delay, the high on conductor 189 operates stop analog gates 166 and 168 in speed generator 120 (FIG. 5A). As a result, the speed signal ramps toward plus 6 volts, and the vehicle decelerates. At the same time, the high state of conductor 189 enables brake generator circuit 330 (FIG. 5C).

When the vehicle speed is close to 0 (i.e., less than one inch per second), the brakes are applied in the manner previously described. The resulting brake signal on conductor 220 also drives the reset inputs of flip-flops 402, 403 and 404 high. As a result, the Q output of flip-flop 403 switches to a low state which propagates through gates 408, 409 to change the output of inverter 413 high. After a time delay, conductor 189 switches low, opening stop analog gates 166 and 168 and changing the brake signal on conductor 220 from high to low.

As the vehicle was decelerating, the brake signal on conductor 221 was high, since the brakes were not yet applied. This inhibited the Q output of flip-flop 382 from going low in response to the changing command from left to right. As conductor 221 was switched to a low state when the brakes were applied, the Q output of flip-flop 382 was changed to a low state, thereby providing the proper initial conditions for acceleration of the vehicle to the right.

The foregoing mode of operation is an important feature which enables the vehicle to come to a complete stop automatically when the direction command is changed. While the vehicle is braking, the speed generator and boundary signal generator circuits achieve the proper initial conditions for reversing the direction of the vehicle. This mode of operation enables the vehicle to change directions safely and in a minimum amount of time.

Those skilled in the art will recognize that the preferred embodiment may be altered and modified without departing from the true spirit and scope of the invention as defined in the accompanying claims.

What is claimed is:

1. In a vehicle including an electric drive motor means for propelling the vehicle and controller means for conducting current from a source of electrical power to the motor means, for changing the current in response to a drive signal in order to control the speed of the motor means, for enabling the motor means to generate torque in a first rotational direction which urges the vehicle in a first lineal direction in response to a first direction signal and for enabling the motor means to generate torque in a second rotational direction which urges the vehicle in a second lineal direction in response to a second direction signal, improved apparatus for enabling the vehicle to move in either of the first or second linear directions within preselected speed boundaries, said apparatus comprising:

tachometer means for generating a tachometer signal dependent on the actual speed of the vehicle;

speed generator means for generating a sustained speed signal defining the speed to be sustained over a period of time and an acceleration signal defining the rate of change of the speed necessary to attain a desired sustained speed;

boundary generator means responsive to the speed signal for generating a boundary signal representation of desired speed boundaries for the vehicle;

drive means for generating said drive signal by comparing the tachometer signal with the speed signal, whereby the motor creates an appropriate amount of torque to achieve the desired speed; and direction means for generating said first direction signal or said second direction signal whenever the actual vehicle speed lies outside the desired speed boundaries, whereby the motor means generates torque in a direction which tends to restore the actual vehicle speed within the desired speed boundaries.

2. Apparatus, as claimed in claim 1, wherein the boundary generator means comprises means for generating a upper speed boundary signal and a lower speed boundary signal.

3. Apparatus, as claimed in claim 2, wherein the boundary generator means comprises means for combining at least a portion of the speed signal with an adjustable speed reference voltage so that the upper and lower speed boundary signals are responsive to the acceleration signal.

4. Apparatus, as claimed in claim 3, wherein the upper speed boundary signal is the inverse of the lower speed boundary signal.

5. In a vehicle including an electric drive motor means for propelling the vehicle, controller means for conducting current from a source of electrical power to the motor means, for changing the current in response to a drive signal in order to control the speed of the motor means, for enabling the motor means to generate torque in a first rotational direction which urges the vehicle in a first lineal direction in response to a first direction signal and for enabling the motor means to generate torque in a second rotational direction which urges the vehicle in a second lineal direction in response to a second direction signal, and a brake which stops the vehicle in response to a brake signal, improved apparatus for enabling the vehicle to move in either of the first or second linear directions within preselected speed boundaries, said apparatus comprising:

tachometer means for generating a tachometer signal dependent on the actual speed of the vehicle;

speed generator means for generating speed signal representing the desired speed of the vehicle;

boundary generator means responsive to the speed signal for generating a boundary signal representation of desired speed boundaries for the vehicle;

drive means for generating said drive signal by comparing the tachometer signal with the speed signal, whereby the motor creates an appropriate amount of torque to achieve the desired speed;

direction means for generating said first direction signal or said second direction signal whenever the actual vehicle speed lies outside the desired speed boundaries, whereby the motor means generates torque in a direction which tends to restore the actual vehicle speed within the desired speed boundaries; and braking generator means responsive to the tachometer signal for generating the brake signal when the speed of the vehicle decelerates below a predetermined value.

6. Apparatus, as claimed in claim 5, and further comprising direction change means for enabling the vehicle to change direction, said direction change means comprising:

command means for generating a first command signal indicating that the vehicle is expected to go in the first lineal direction or a second command signal indicating that the vehicle is expected to go in the second lineal direction;

direction store means responsive to the first command signal for enabling the speed generator means to generate a speed signal corresponding to the movement of the vehicle in the first lineal direction and responsive to the second command signal for enabling the speed generator means to generate a speed signal corresponding to movement of the vehicle in the second lineal direction; and processor means for enabling the speed generator means to generate a speed signal corresponding to a zero speed condition in response to a change from the first command signal to the second command signal, for enabling the brake generator means to generate the brake signal when the vehicle decelerates below the predetermined value, and for enabling the direction store means to respond to the second command signal after the brake is released, whereby the vehicle moves in the second lineal direction after coming to a complete stop.

7. Apparatus, as claimed in claim 1, 2, 3, 4, 5, or 6, wherein the source of electrical power comprises battery means for providing power to the electric drive motor means, whereby the vehicle is independently movable to remote locations.

* * * * *